United States Patent
Loeffler et al.

(10) Patent No.: US 7,324,563 B2
(45) Date of Patent: Jan. 29, 2008

(54) METHOD AND APPARATUS FOR TRANSPORTING A SDH/SONET CLIENT SIGNAL AS A SERVICE

(75) Inventors: Manfred Alois Loeffler, Igensdorf (DE); Jan Hendrick Steinvoort, Huizen (NL); Oliver Tamm, Eckental (DE)

(73) Assignee: Lucent Technologies Inc, Murray Hill, NJ (US)

( * ) Notice: Subject to any disclaimer, the term of this patent is extended or adjusted under 35 U.S.C. 154(b) by 993 days.

(21) Appl. No.: 10/364,226

(22) Filed: Feb. 11, 2003

(65) Prior Publication Data
US 2003/0152079 A1 Aug. 14, 2003

(30) Foreign Application Priority Data
Feb. 12, 2002 (EP) .................. 02250958

(51) Int. Cl.
*H04J 3/04* (2006.01)
(52) U.S. Cl. ............ 370/535; 370/235; 370/392; 370/401; 370/907
(58) Field of Classification Search ......... 370/392, 370/474, 498, 532, 533, 534, 535, 907
See application file for complete search history.

(56) References Cited
U.S. PATENT DOCUMENTS 5,315,594 A * 5/1994 Noser .................. 370/353
5,850,387 A * 12/1998 Lyon et al. .............. 370/250
6,169,754 B1 * 1/2001 Sugawara et al. ........ 370/535
6,870,860 B1 * 3/2005 Meagher et al. ......... 370/535
6,944,190 B1 * 9/2005 Tomar et al. ............ 370/535
2002/0080828 A1 * 6/2002 Ofek et al. .............. 370/539
2002/0080829 A1 * 6/2002 Ofek et al. .............. 370/539
2005/0141569 A1 * 6/2005 Meagher et al. ......... 370/907

FOREIGN PATENT DOCUMENTS
EP 0 874 488 A2 10/1998

* cited by examiner

*Primary Examiner*—Hassan Kizou
*Assistant Examiner*—Mounir Moutaouakil

(57) ABSTRACT

SDH/SONET signals are transported as a service including payload and overhead information by mapping associated payload data or information and selected associated overhead data or information of at least one SDH/SONET client signal to be transported into a SDH/SONET server signal. More specifically, client overhead information of the SDH/SONET client signal is mapped into free overhead positions of the SDH/SONET server signal. The SDH/SONET server signal is then transported with the SDH/SONET client signal including associated payload and overhead information embedded therein.

5 Claims, 18 Drawing Sheets

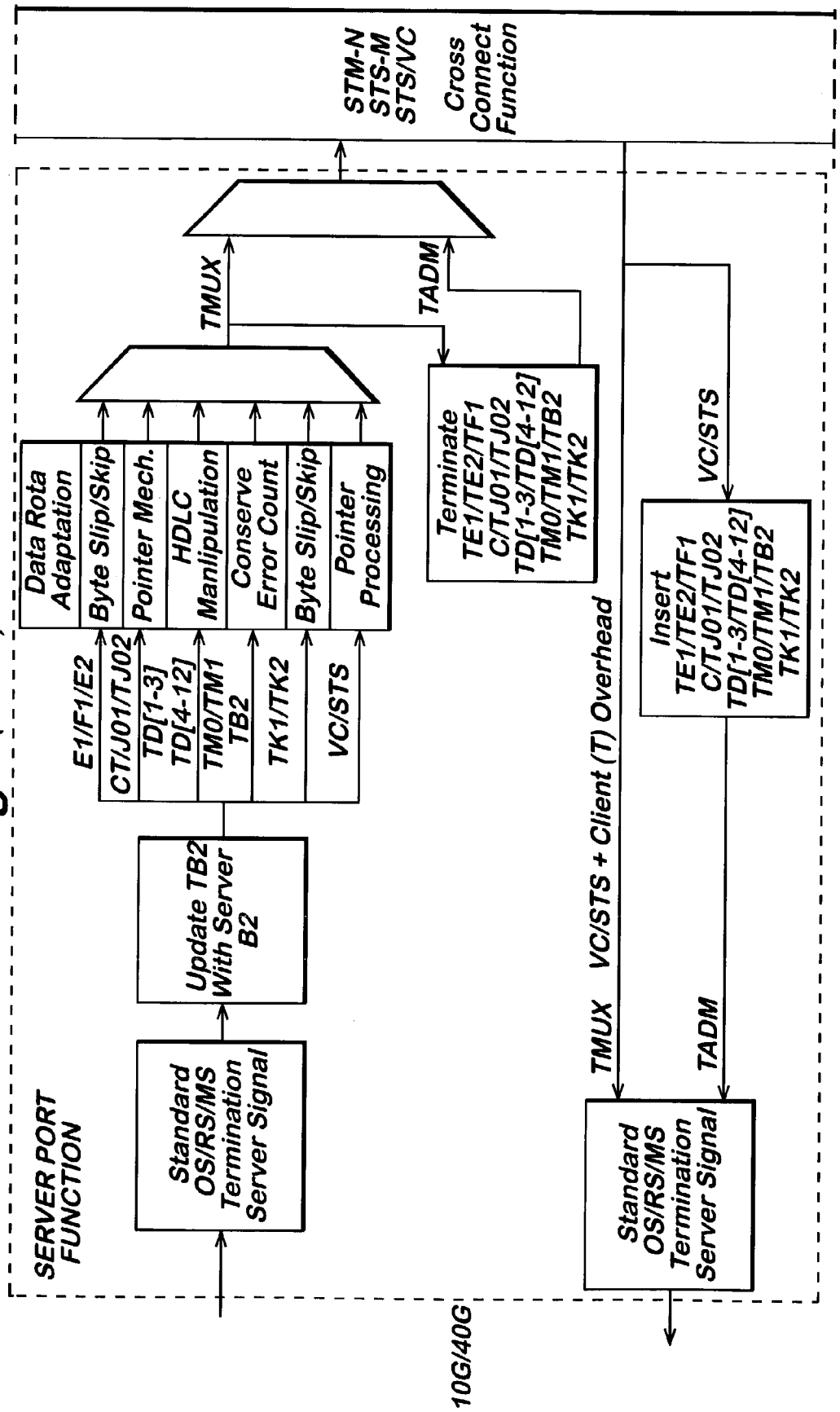
Fig. 4 (Contd.)

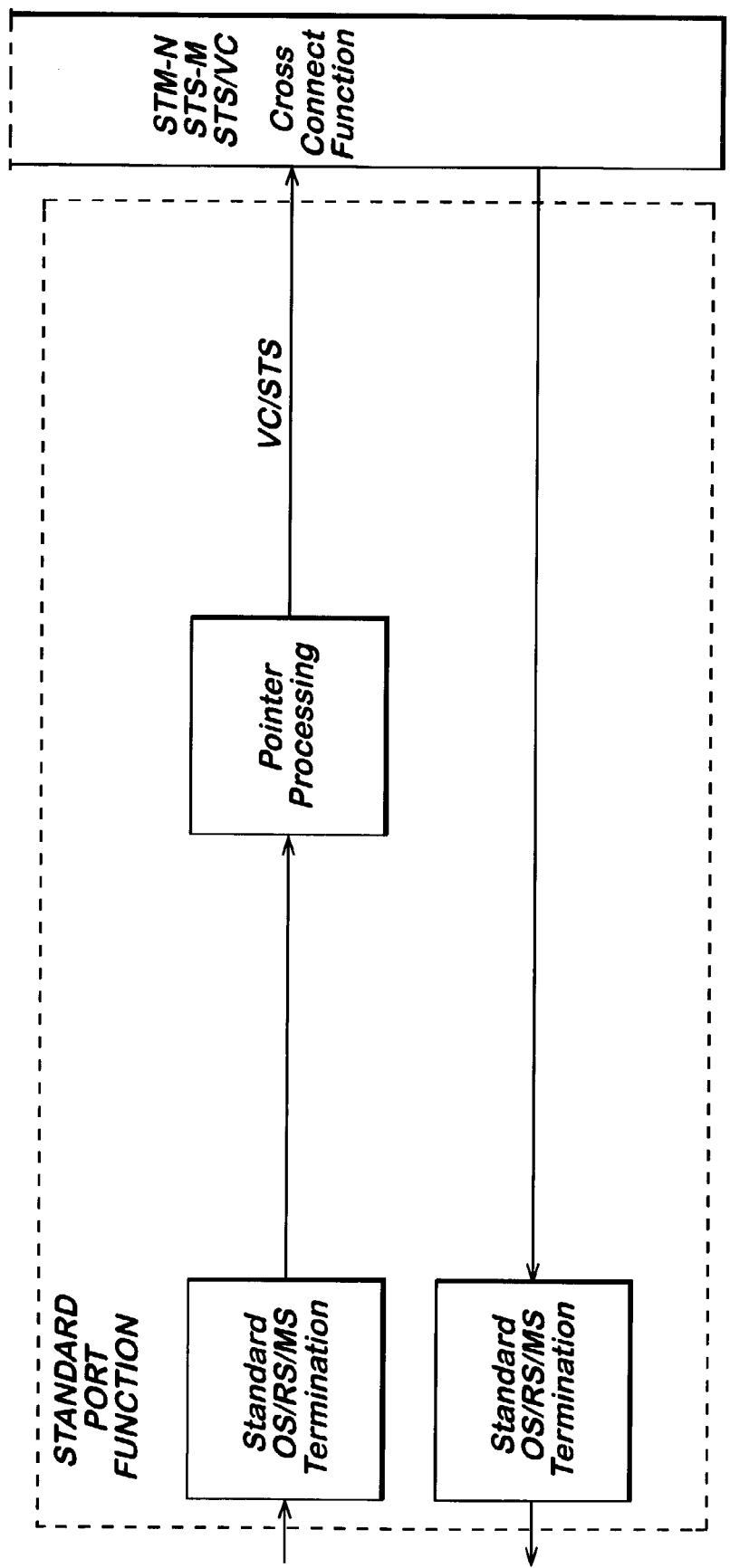
*Fig. 4 (Contd.)*

Fig. 5a

STM-64/STS-192 Client Overhead Definition

| Row\Col | 1 | 2-64 | 65 | 66-128 | 67 | 68-192 | 193 | 194-256 | 266 | 267-320 | 321 | 322-384 | 385 | 386-448 | 449 | 450-512 | 513 | 514-576 |
|---|---|---|---|---|---|---|---|---|---|---|---|---|---|---|---|---|---|---|
| 1 | A1 | A1 | A1 | A1 | A1 | A1 | A2 | A2 | A2 | A2 | A2 | A2 | J0 | Z0 | NU | NU | NU | NU |
| 2 | B1 | FEC | | | | | E1 | FEC | | | | FEC | F1 | | | | | |
| 3 | D1 | FEC | | | | | D2 | FEC | | | | FEC | D3 | FEC | | FEC | | FEC |
| 4 | STS/AU Pointer(s) | | | | | | | | | | | | | | | | | |
| 5 | B2 | B2 | B2 | B2 | B2 | B2 | K1 | FEC | | FEC | K2 | FEC | | FEC[a] | TE1 | FEC[b] | TD1 | FEC[c] |
| 6 | D4 | | | | | | D5 | | | | | | D6 | FEC[d] | TB2a | FEC[e] | TD4 | FEC[f] |
| 7 | D7 | | | | | | D8 | | | | | | D9 | FEC | C | FEC[g] | TD7 | FEC[h] |
| 8 | D1n | | | | | | D11 | | | | | | D12 | FEC | | FEC | TD11 | FEC[i] |
| 9 | S1 | | | | | | | | M0/M1 | | | | E2 | | | | | |

*Fig. 6a*

STM-256/STS-768 Client Overhead Definition

| Row/Col | 1 | 2-256 | 257 | 258-512 | 513 | 514-768 | 769 | 770-1024 | 1025 | 1026-1280 | 1281 | 1282-1536 | 1537 | 1538-1792 | 1793 | 1794-2048 | 2049 | 2046-2304 |
|---|---|---|---|---|---|---|---|---|---|---|---|---|---|---|---|---|---|---|
| 1 | A1 | | | | | A2 | | | | | | | J0 | Z0 | NU | NU | NU | NU |
| 2 | B1 | FEC | | | | | E1 | FEC | | | | FEC | F1 | | | | | |
| 3 | D1 | FEC | | | | | D2 | FEC | | | | FEC | D3 | FEC | | FEC | | FEC |
| 4 | | | | | | | | STS/AU Pointer(s) | | | | | | | | | | |
| 5 | B2 | B2 | B2 | B2 | B2 | B2 | K1 | FEC | | FEC | K2 | FEC | | FEC[a] | FEC[b] | FEC[c] | TE1 | TD1 |
| 6 | D4 MxDCC | | | | | | D5 | | | | | FEC[d] | D6 | FEC[d] | TB2a | FEC[e] | TD4 | FEC[f] |
| 7 | D7 MxDCC | | | | | | D8 | | | | | | D9 | FEC | C | FEC[g] | TD7 | FEC[h] |
| 8 | D1n MxDCC | | | | | | D11 | | | | | | D12 | FEC | | FEC | TD11 | FEC[i] |
| 9 | S1 | | | | | | M0/M1 | | | | | | E2 | | | | | |

Fig. 6b

| | 1 | 2 | 3 | 4 | ... | 16 | 17 | 18 | 19 | 20 | ... | 240 | 241 | 242 | 243 | 244 | ... | 256 |
|---|---|---|---|---|---|---|---|---|---|---|---|---|---|---|---|---|---|---|
| FEC[a] | K2 | TK1 | TK2 | P1 | | P1 | | TK1 | TK2 | P1 | | P1 | | TK1 | TK2 | P1 | | P1 |
| FEC[b] | TE1 | TF1 | TE2 | P1 | | P1 | TE1 | TF1 | TE2 | P1 | | P1 | TE1 | TF1 | TE2 | P1 | | P1 |
| FEC[c] | TD1 | TD2 | TD3 | P1 | | P1 | TD1 | TD2 | TD3 | P1 | | P1 | TD1 | TD2 | TD3 | P1 | | P1 |
| FEC[d] | D6 | TM0 | TM1 | P1 | | P1 | | TM0 | TM1 | P1 | | P1 | | TM0 | TM1 | P1 | | P1 |
| FEC[e] | TB2a | TB2b | | P1 | | P1 | TB2a | TB2b | | P1 | | P1 | TB2a | TB2b | | P1 | | P1 |
| FEC[f] | TD4 | TD5 | TD6 | P1 | | P1 | TD4 | TD5 | TD6 | P1 | | P1 | TD4 | TD5 | TD6 | P1 | | P1 |
| FEC[g] | C | TJ01 | TJ02 | P1 | | P1 | C | TJ01 | TJ02 | P1 | | P1 | C | TJ01 | TJ02 | P1 | | P1 |
| FEC[h] | TD7 | TD8 | TD9 | P1 | | P1 | TD7 | TD8 | TD9 | P1 | | P1 | TD7 | TD8 | TD9 | P1 | | P1 |
| FEC[i] | TD10 | TD11 | TD12 | P1 | | P1 | TD10 | TD11 | TD12 | P1 | | P1 | TD10 | TD11 | TD12 | P1 | | P1 |

OH Bytes For Client #1 (columns 1–3); OH Bytes For Client #2 (columns 17–19); OH Bytes For Client #16 (columns 241–243)

METHOD AND APPARATUS FOR TRANSPORTING A SDH/SONET CLIENT SIGNAL AS A SERVICE

CROSS-REFERENCE TO RELATED APPLICATION

This application claims the benefit of priority from corresponding European Application Serial No. 02250958.2, filed Feb. 12, 2002.

TECHNICAL FIELD

The invention relates generally to optical transmission according to the SONET/SDH format and, more particularly, to the transport of SDH/SONET client signals as a service, wherein the associate SDH/SONET client payload is embedded within a SDH/SONET server signal.

BACKGROUND OF THE INVENTION

As is generally known for systems and/or networks complying to the current SDH (Synchronous Digital Hierarchy) and SONET (Synchronous Optical Network) standards and, in particular, according to the International Telecommunication Union ITU standard concerning SDH and/or SONET-based signals, the multiplexing and the demultiplexing of such signals is restricted to the payload data incorporated in these SDH/SONET signals. Thus, the overhead data carrying information, in particular information concerning maintenance and multiplex protection, is always terminated by the associated section termination function implemented in the respective network elements.

As a consequence, the maintenance and protection capabilities are restricted to the respective sections where they are carried and, in particular, to the optical section, the regenerator section, and/or multiplex section, but not along the service path itself.

A functional model of a SDH/SONET multiplexer according to known standard SDH/SONET terminations is shown, for example, in the appended FIG. 10. As can be seen therefrom, for each standard port 1 to "n", the optical, regenerator and multiplex section layers of the SDH/SONET signals are always terminated by the associated standard optical section OS, regenerator section RS, and multiplex section MS termination functions, respectively. The connectivity based on the connection functions for STSNC (S3/S4) and the transparent transport of data is therefore limited to the VC/STS (Virtual Container/Synchronous Transport Signal) payload embedded within the server signals or carriers, in particular, within optical carriers.

A disadvantage of this architecture is that SDH/SONET systems are not able to transport the SDH/SONET signals as a service and, in particular, as an end-to-end service. As is known, end-to-end services over SDH/SONET networks are always restricted to the associated payload.

Moreover, with regard to a usual application according to the known state of the art, FIG. 11 depicts a common carrier application based on known SDH/SONET and all-optical transmission solutions. According to the depicted exemplary application, a metropolitan network operator has two metropolitan SDH/SONET networks $N_{CA}$ connected via a second operator's core network $N_{CC}$, which consists of SDH/SONET network elements 10 and optical cross connect and/or DWDM (dense wavelength division multiplex) equipment 20. The metropolitan networks $N_{CA}$ merely consist of SDH/SONET network elements 10, in particular, SONET/SDH cross connect and/or add/drop multiplexer network elements.

As the signals in the carrier network $N_{CC}$ have to cross standard SDH/SONET equipment 10 at least at the handoff points 202 between the respective networks, only SDH/SONET payload connectivity between the two metropolitan networks $N_{CA}$ is possible. As a consequence, the two networks $N_{CA}$ are islands in terms of network management and line protection schemes. Moreover, since the metropolitan network $N_{CA}$ operator only uses SDH/SONET network elements 10, the service which he can offer between the respective service interfaces 201 is also restricted to SDH/SONET payload only, regardless if the service has to cross the carrier network $N_{CC}$ or not.

Thus, the need of also transporting the SDH/SONET signal itself as a service is foreseen and already strongly requested from several network operators. One approach to support this could be the introduction of a separate optical layer. However, there would be disadvantages associated with the introduction of completely new families of products.

Moreover, even if the carriers carrier network $N_{CC}$ is changed into an all-optical network, as depicted in FIG. 12, i.e., merely having optical cross connect and/or DWDM equipment 20 which is capable of transporting SDH/SONET signals including the SDH/SONET overhead data, the two metropolitan networks $N_{CA}$ are still not able to offer SDH/SONET signals as an end-to-end service between the service interfaces 201 due to the use of standard SDH/SONET cross connect and/or add/drop multiplex equipment 10. However, the operator of the metropolitan networks $N_{CA}$ gain the ability to connect the two network islands $N_{CA}$ in terms of network management and line protection schemes, when the carrier network $N_{CC}$ is introducing such an all-optical network according to FIG. 12, and is not gaining anymore from the SDH/SONET-based network $N_{CC}$, as depicted in FIG. 11.

Furthermore, in addition to these above mentioned problems, a further very important issue with traditional SDH/SONET systems exists on transoceanic transmission. As is generally known, transoceanic transmission systems need standard SDH/SONET framed signals as input, which are wrapped into a proprietary frame including very strong forward error correction (FEC) schemes that enable them to transmit over very long distances without the need of signal regeneration. However, because bandwidth per lambda (wavelength) also determines the cost of transoceanic transmission, transoceanic systems are driven to 10 Gigabit transmission per lambda. On the other hand, there is a strong market need to support 2.5 Gigabit, transparent SDH/SONET services across the ocean.

One known way to support transparent 2.5 Gigabit services is to employ proprietary multiplexing of 4 times 2.5 Gigabit SDH/SONET signals and to then wrap this 10 Gigabit signal along with additionally added FEC for transport as a signal via a lambda (wavelength). Since the 10 Gigabit output signal is incompatible with a 10 Gigabit SDH/SONET signal, there is no way to transport this signal over transoceanic systems.

SUMMARY OF THE INVENTION

According to the principles of the invention, SDH/SONET signals are transported as a service including payload and overhead information by mapping associated payload data or information and selected associated overhead data or information of at least one SDH/SONET client signal to be transported into a SDH/SONET server signal, wherein the client overhead information of the SDH/SONET client signal is mapped into free overhead positions of that SDH/SONET server signal. The SDH/SONET server signal is then transported with the SDH/SONET client signal including associated payload and overhead information embedded therein.

Because the SDH/SONET server signal format need not be changed, the inventive functionality can be integrated into SDH/SONET systems without changing the basic transmission concept and, hence, the inventive approach enables the transport of SDH/SONET client signals as a transparent or native service even over existing transoceanic systems that require standard SDH/SONET framed signals.

According to one illustrative embodiment of the invention, the mapping of overhead data or information comprises the routing of at least overhead information for maintenance, management and protection purposes of the client signal through a STS-VC cross connection matrix to further enhance a straightforward integration into existing SDH/SONET network element concepts.

Because a standardization thereof is not given in the SDH/SONET standards, it is further proposed to select overhead positions of the client signal, wherein the positions comprise specific standard overhead information, and to map such specific standard overhead information of the selected positions to determinable client overhead positions of the respective associated client payload for multiplexing such adapted client payload into the SDH/SONET server signal. Advantageously, this approach allows physically the same column-based cross connect function to be used for connecting both STSNC payload and SDH/SONET client signals.

In one exemplary embodiment in asynchronous network environments, a time synchronization and/or data rate adaptation of certain SDH/SONET client overhead data or information is preferably performed prior to the step of mapping to ensure that the logical content thereof is maintained and thereby a smooth operation over timing domains.

According to another illustrative embodiment, the step of mapping the selected client overhead information is performed at the input of a network by means of multiplexing the overhead information into a server signal having a higher bit rate in comparison to the at least one client signal. In this manner, the client overhead information can be transparently transported within server signal overhead positions that are not defined by the standards thereby ensuring that, at an output of a network, the mapped client overhead information can be at least partially processed and mapped back into the respectively defined standard overhead positions of the SDH/SONET client signal.

According to another embodiment, the transparent SDH/SONET signal transport functionality is combined together with SDH/SONET payload-based transport functions in a network element, especially for enabling the termination of SDH/SONET client overhead information embedded within the server signal. In this manner, equipment costs can be reduced by virtue of the reduced complexity.

In one illustrative embodiment of an apparatus for carrying out the invention, a network element such as an add-drop multiplexer unit includes means for cross connecting overhead information of a SDH/SONET client signal within a SDH/SONET server signal, a client port means for the input and output of SDH/SONET client signals which are needed to be transported transparently, a server port means for a SDH/SONET server signal having at least one embedded client signal and/or means for performing cross connections for entities respectively of the same logical layer.

Furthermore, it is proposed to adapt the network element with apparatus for selectively or partially terminating overhead information of the SDH/SONET client signal to be embedded within the server signal, means for time synchronizing and/or adapting the data rate of the selectively or partially terminated SDH/SONET client overhead information, and/or means for multiplexing the selectively or partially terminated overhead information into a preferably higher rate server signal for ensuring that the integrated SDH/SONET client overhead information can be transported transparently or native and can be demultiplexed at a network output.

According to an exemplary embodiment, a network element comprises means for terminating SDH/SONET client overhead information embedded within a SDH/SONET signal and/or means for detecting the structure of a received server signal with embedded SDH/SONET client overhead information based on a concatenation scheme identified by pointer bytes.

By integrating the transparent transport of SONET/SDH signals and/or frames as a service including payload and overhead information into existing SDH/SONET systems and system concepts according to the principles of the invention, coupled with the capability to co-exist with standard compliant SDH/SONET payload service functions, a significant value to these networks and/or systems is realized. Because a change of server or server line signal format is avoided, the multiplexing of SDH/SONET signals and/or frames into higher bit rate SDH/SONET signals and the transporting of these higher bit rate SDH/SONET signals over existing state of the art transoceanic systems is enabled, while mapping functionality of the additional transported overhead information is compatible with existing SDH/SONET regenerators, transoceanic systems and standardized multi-bit forward error correction approaches. Additionally, based on the easy integration into existing SDH/SONET network elements, fiber components are saved, especially in dual ring interworking applications, and the gain of handling the new functionality as an additional service is enabled.

BRIEF DESCRIPTION OF THE DRAWING

A more complete understanding of the invention may be obtained from consideration of the following detailed description of the invention in conjunction with the drawing, with like elements referenced with like reference numerals, in which:

FIGS. 5a, 5b depict an exemplary mapping approach of STM-64/STS-192 server signals according to the principles of the invention;

FIGS. 6a, 6b depict another exemplary mapping approach of STM-256/STS-768 server signals according to the principles of the invention;

DETAILED DESCRIPTION

Figure 1:
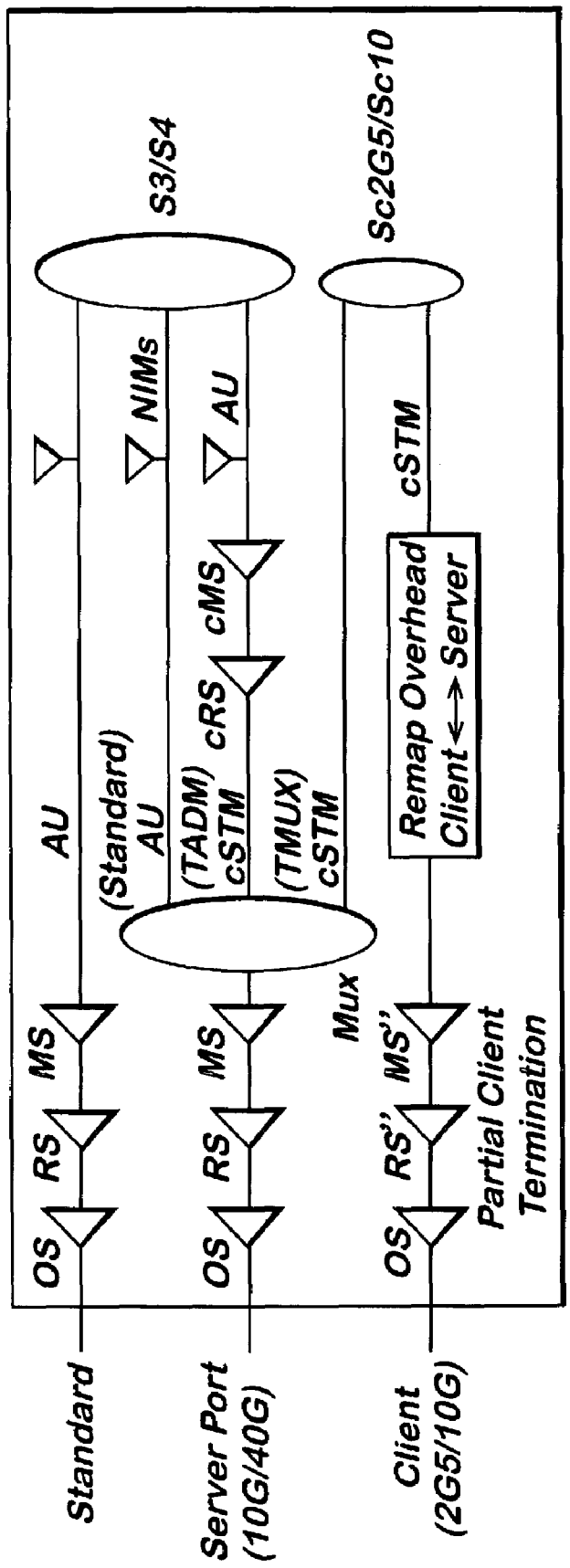
FIG. 1 schematically depicts a SDH/SONET functional model of transparency on a network element level according to the invention.

In FIG. 1, a functional model of the transparent transport functionality on a network element's level according to the invention is shown. Three types of ports are defined as being a standard port, a server port or a client port.

The standard port refers to standard add-drop multiplex operation and the server port is used for higher rate signals such as, for example, 10 G or 40 G signals with the embedded clients signals according to the invention. Such a SDH/SONET signal, which is transported semi-transparently over the SDH/SONET network as an end-to-end service, enters and leaves the multiplexer at the client port. This signal, for example, could be a 2.5 Gigabit (2.5 G) or 10 Gigabit (10 G) signal.

The elements identified in FIG. 1 with reference signs OS, RS and MS provide the standard section termination functions, i.e. the optical section termination function (OS), the regenerator section termination function (RS) and the multiplex section termination function (MS), respectively. With the client port, an adapted client regenerator section RS" and an adapted client multiplex section entity MS" is implemented for performing only a partial termination of the overhead of the SDH/SONET signal. For certain applications, the client regenerator section RS" is provided for the overhead termination of the bytes B1, NU_RS and the client multiplex section entity MS" is provided for the client overhead termination of the bytes S1, NU_MS. Thus, overhead bytes of the client overhead information, which are important for management, maintenance and protection, are not terminated or are terminated and newly generated. These overhead bytes are remapped from the client signal to the server signal as described in more detail below.

For further enabling the capability of multiplexing and demultiplexing the partially terminated SDH/SONET signal as a client within a higher rate SDH/SONET aggregate server signal, which is further referred to as the TMUX (Transparent Multiplexing) functionality, and for enabling the capability of terminating the MS/RS overhead of the at least one SDH/SONET client signal, which is embedded within the higher rate server signal carrying the service and is further referred to as the TADM (Transparent Add/Drop Multiplexer) functionality, an additional support entity layer is introduced by means of which the SDH/SONET signals can be cross connected in the network element. As can be seen from FIG. 1, this support layer can have three values, e.g., standard for performing the standard ADM (add and drop multiplexing) operation, and TMUX or TADM for the two different modes of transparent client connectivity (with regard to the client synchronous transport module cSTM) by the multiplexer.

Moreover, for terminating the MS/RS client overhead data embedded within the server signal, a client regeneration section entity cRS and a client multiplexer section cMS is introduced for the purpose of managing the client overhead, wherein the entity cRS performs the client regeneration section overhead termination of bytes (T)DCCR, (T)E1, (T)F1 and (T)J0. The entity cMS performs the client multiplex section overhead termination of bytes (T)DCCM, (T)E2, (T)K1, (T)K2, (T)M0, (T)M1 and (T)B2. The index or character "T" is being used here to identify the transparency of the client overhead bytes.

The functional model according to FIG. 1 further shows the connection functions means S3/S4 and Sc2.5 G/Sc10 G for providing STS/HO-VCs payload or SONET/SDH client signals as separate entities even if, in a physical implementation, the connection functions means are preferably performed by the same hardware.

Figure 2:
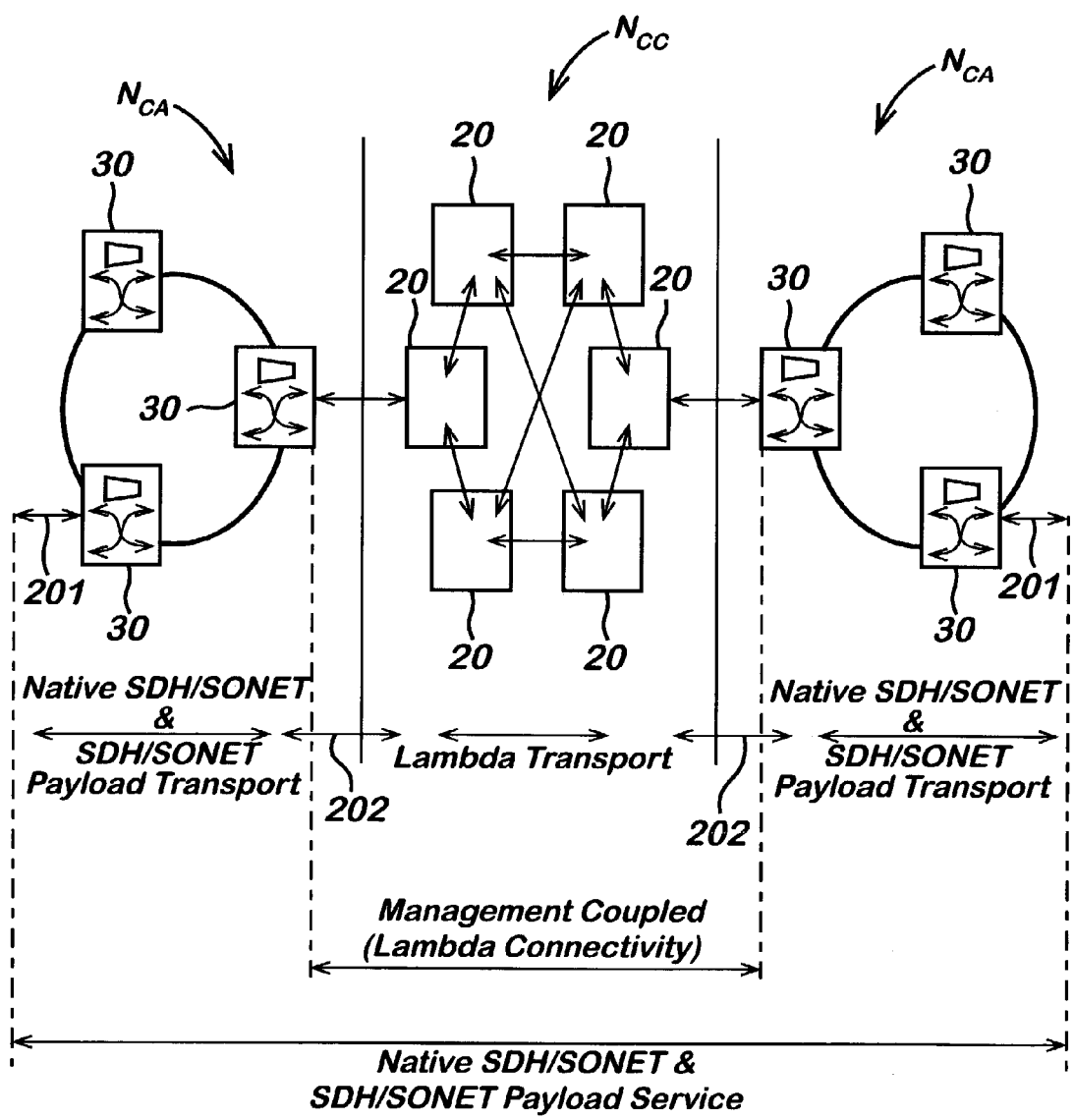
FIG. 2 schematically depicts a transparent SDH/SONET carrier networking overall optical core according to the invention.
Figure 12:
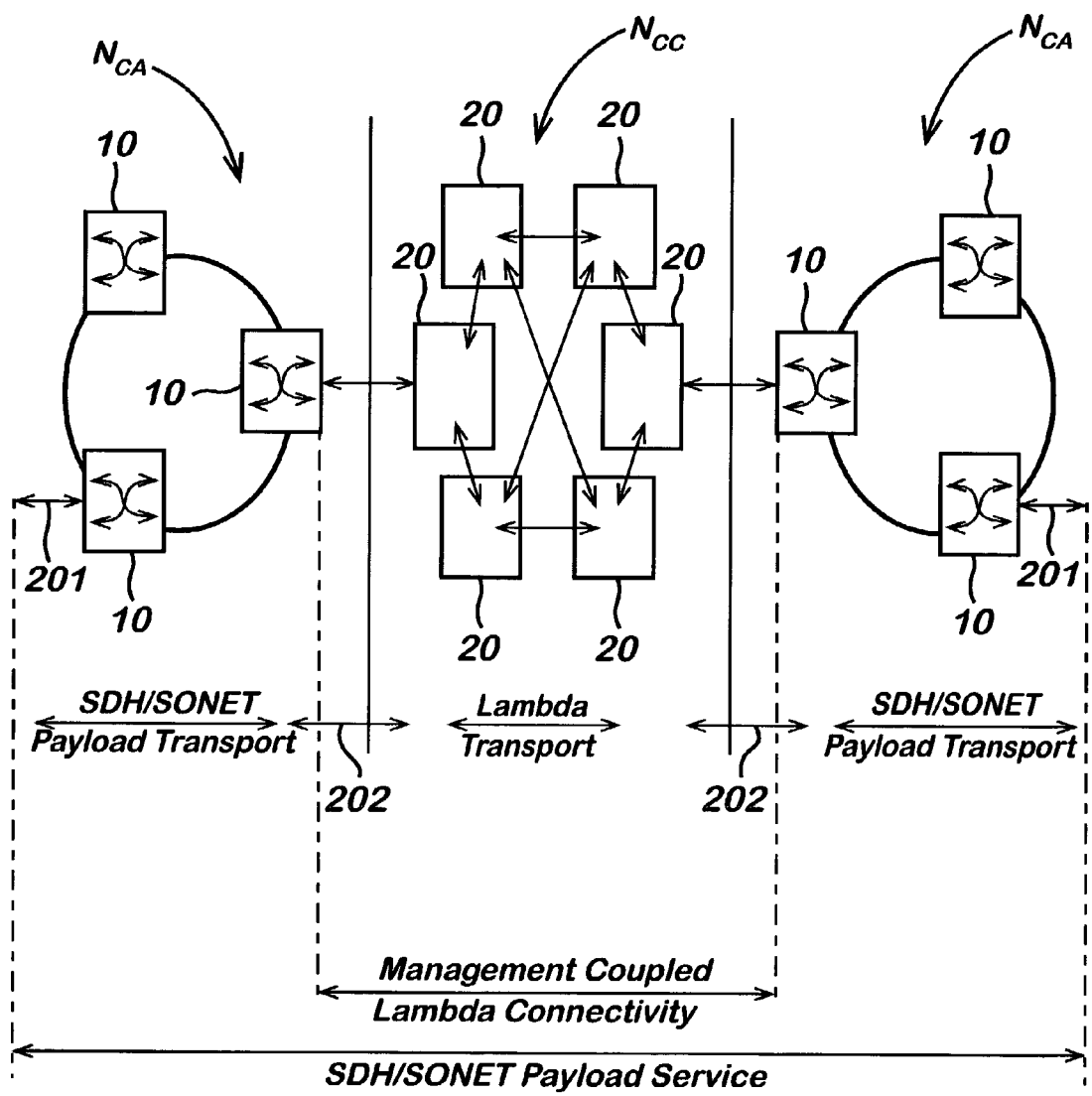
FIG. 12 schematically depicts a SDH/SONET carrier networking overall optical core according to prior art arrangements.

Substantially based on the functional model of FIG. 1, FIG. 2 depicts a scenario in which a metropolitan network operator upgrades his networks $N_{CA}$ or the respective incorporated network elements 30 to be able to also transport the overhead information of SDH/SONET signals by means of overhead transparency functionality. Based on the standard carrier network shown in FIG. 12, e.g., having optical cross connect and/or DWDM equipment 20 that is capable of transporting the SDH/SONET signals including the SDH/SONET overhead data as described in the introductory portion, the carrier of network $N_{CA}$ is now able to offer end to end transparency, e.g., transparent or native SDH/SONET services in addition to traditional SDH/SONET payload services as a result of the adaptation of network elements 30 to correspondingly perform SONET/SDH cross connection or add-drop multiplexer functionality together with transparent cross connection and/or multiplexing functionality.

Figure 3:
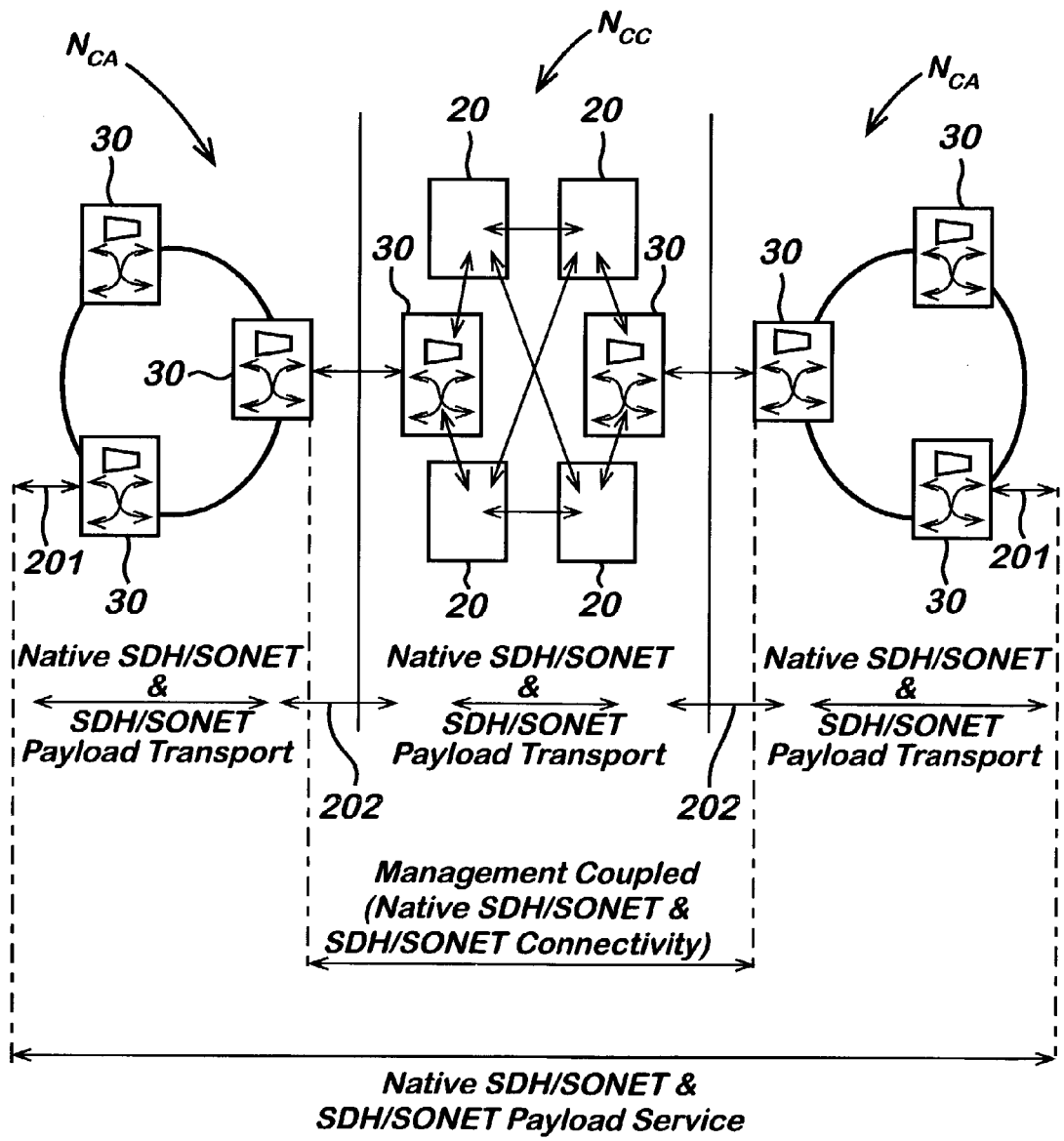
FIG. 3 schematically depicts a transparent SDH/SONET carrier networking over mixed transparent SDH/SONET and optical core according to the invention.
Figure 11:
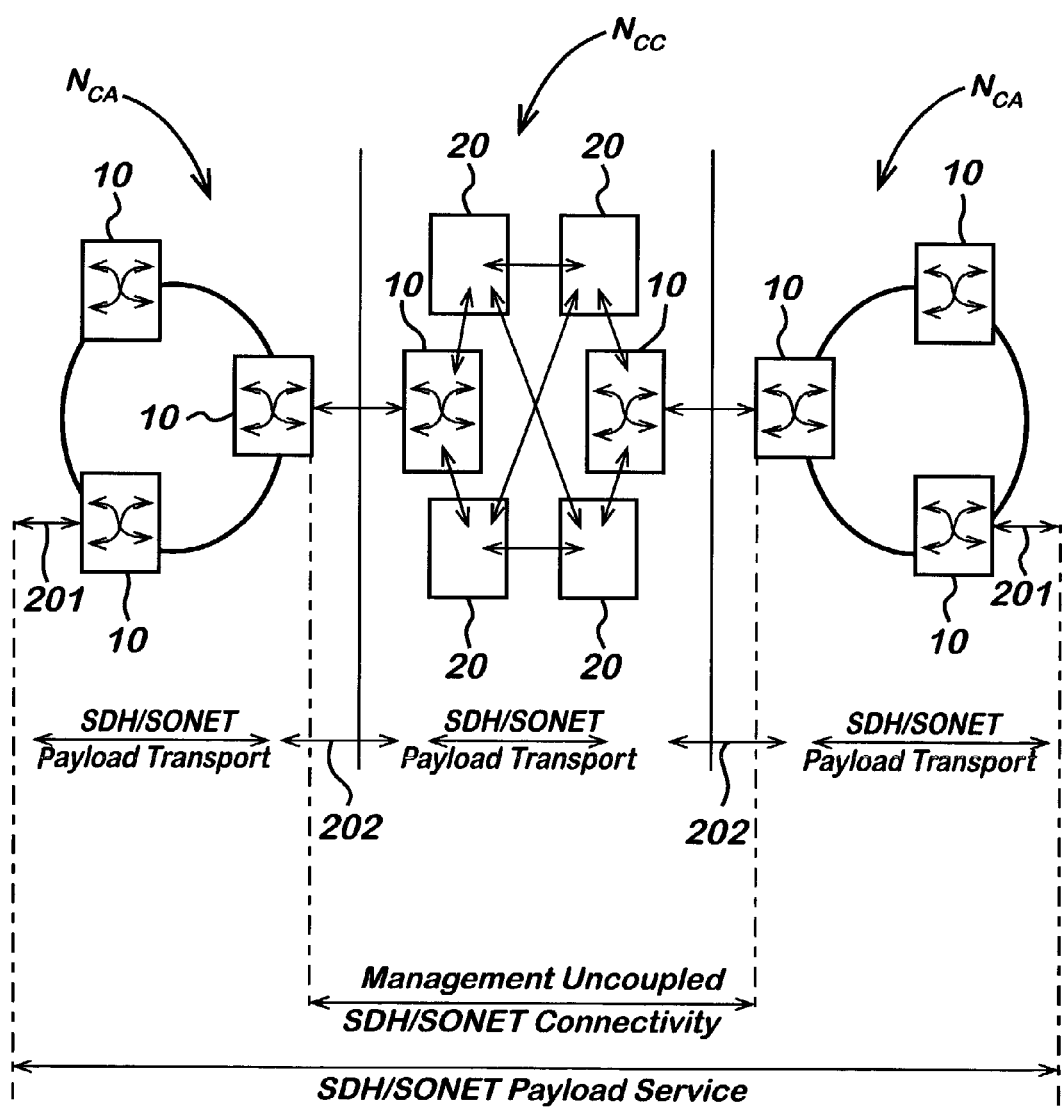
FIG. 11 schematically depicts a SDH/SONET carrier networking over mixed SDH/SONET and optical core according to prior art arrangements.

If, however, the carrier network $N_{CC}$ is not upgraded to an all-optical network with network elements 20 performing optical cross connection and/or DWDM line system functionality, existing SDH/SONET network elements 10 of the carrier network $N_{CC}$ as depicted in FIG. 11 can be upgraded as an alternative to corresponding SDH/SONET network elements 30 according to the invention to also support overhead transparency. In such a scenario, as depicted in FIG. 3, the customer networks $N_{CA}$ may be provided with transparent SDH/SONET services by the carrier network $N_{CC}$ enabling the networks $N_{CA}$ the same benefits or services as depicted in FIG. 2.

Moreover, such client overhead transparency integrated in a server signal is compatible to transoceanic transmission systems as the output signal is a native SDH/SONET signal. Thus, the inventive approach can be used as 4 times 2.5 G multiplexing functionality for 10 G based transoceanic systems.

For the purpose of simplifying the RS/MS overhead, transparency can be restricted to the overhead bytes, which are important for management, maintenance and protection. As is generally known, such RS-overhead bytes include, for example:

| | |
|---|---|
| Y0 | carrying a section trace identifier (STI) in a 1, 16 or 64 bytes string format, |
| D[1-3] | used for 192 kbit/s data communication channels, |
| E1 | used for 64 kbit/s order via channels, |
| F1 | used for 64 kbit/s user channels, | and MS-overhead bytes include, for example:

| | |
|---|---|
| K1/K2 | used for the automatic protection switching (APS), |
| D[4-12] | used for 576 kbit/s data communication channels, |
| E2 | used for 64 kbit/s order wire channels, |
| B2 | used for the MS error monitoring with BIP 8-N parity and N = 48 for STS-48/STM-16, and N = 192 for STS-192/STM-64, |
| M1 | used for the MS remote error indication, and |
| M0 | used for the extended remote error indication. |

To easily integrate the semi-transparent multiplexing functionality according to the invention into the basic SDH/SONET transmission architecture, a system architecture is described subsequently, in particular with regard to FIG. 4, which shows the integration of standard SDH/SONET and transparent transport functions a system architecture viewpoint.

In general, a higher order cross connection matrix for STS/HO-VC payload is implemented within a SDH/SONET multiplexer entity by a column switch. All columns of the STS/HO-VC then have to be routed by this switch including the overhead columns holding the pointer bytes H1/H2/H3. The RS and MS overhead positions associated with each STS/HO-VC payload are routed through the matrix together with the payload.

In a standard SONET/SDH multiplexer, the overhead byte positions routed by the column switch do not contain any overhead data, as the overhead bytes are typically terminated in front of the matrix and are not passed through by a pointer processing function which aligns the payload to enable columns switching. Accordingly, the network element can be adapted according to the principles of the invention as follows.

For SONET/SDH signals that have to be transported as an end-to-end SONET/SDH client signal, the overhead bytes of these clients are re-mapped into the overhead positions of the associated STS-1/VCs in such a way that the client overhead is preserved with the associated payload while it is routed through a column-based STS/VC cross connect matrix. This approach allows physically the same column-based cross connect function to be used for connecting both STS/VC payload and client SONET/SDH signals.

Practically, at the input of a network, the standard overhead of the client is mapped to client overhead positions of the associated payload. Multiplexing of the client payload into the server signal then results in that the client overhead is contained in the overhead of the server signal, so the server signal carries the overhead of the client signal(s) in addition to the overhead of the server signal itself, wherein the client overhead bytes are transported in server signal overhead positions which are not defined by the standards. The mapping of a standard overhead to a transparent client overhead is proposed to be as shown in the following chart, in which the character "T" is identifying the transparent client overhead bytes:

| Standard Overhead | Client Overhead | Remarks |
|---|---|---|
| J0 | C/TJ01/TJ02 | J0 bytes + pointer |
| D[1-3] | TD[1-3] | |
| E1 | TE1 | |
| F1 | TF1 | |
| K1/K2 | TK1/TK2 | |
| D[4-12] | TD[4-12] | |
| E2 | TE2 | |
| M0/M1 | TM0/TM1 | |
| N*B2 | TB2a/TB2b | 2 byte error count |

At the output of a network, the client overhead is partially processed and mapped back into the standard overhead positions of the transparent client.

FIGS. 5a, 5b or 6a, 6b show exemplary embodiments for the mapping of the client overhead data within the overhead of STM-64/STS-192 and STM-256/STS-786 server signals.

Figure 5B:
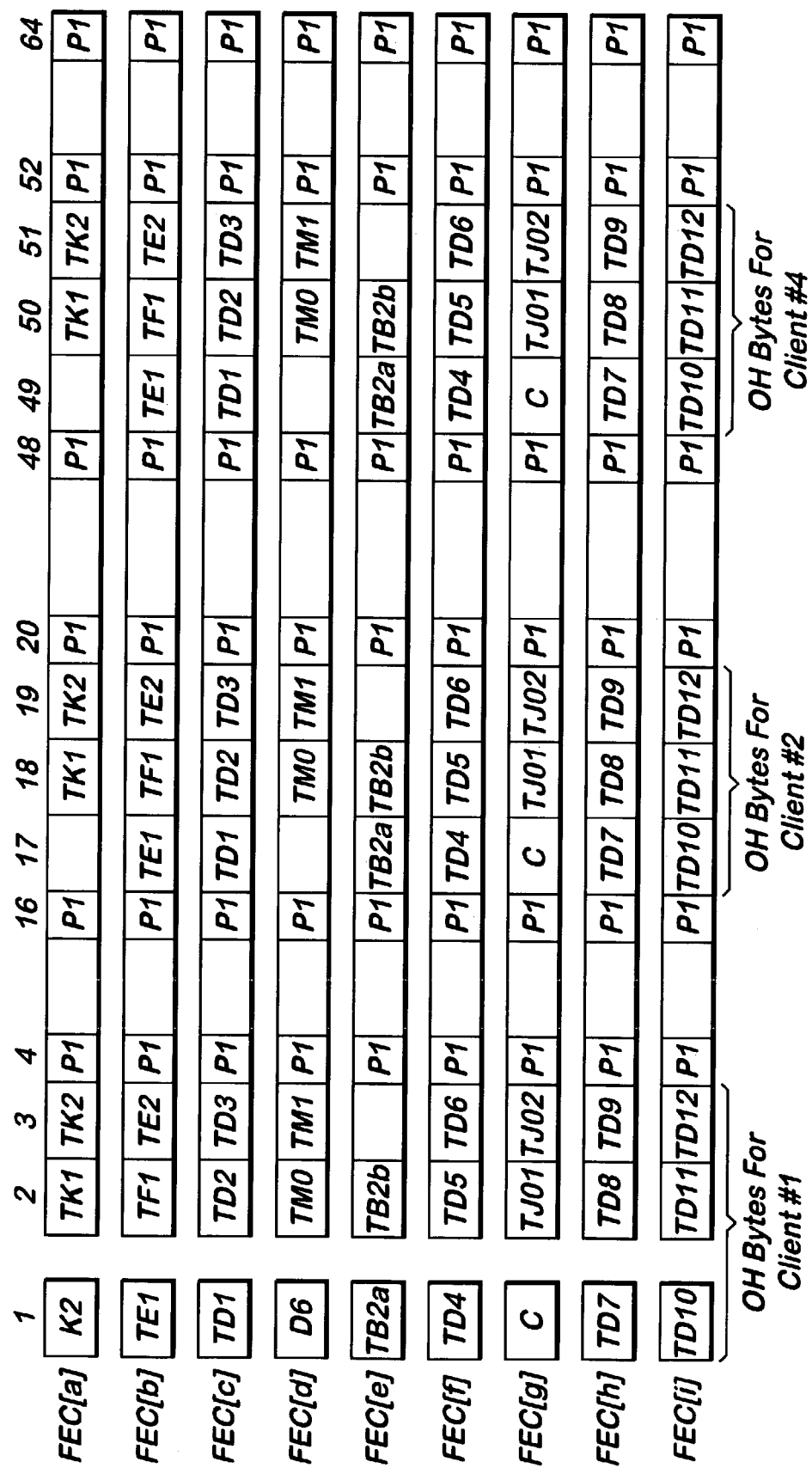

In particular, FIGS. 5a and 5b show an example of mapping into STM-64/STS-192 server signals with the overhead bytes from 2.5 G client signals mapped into unused bytes of the multiplex section of a 10 G transport signal. FIG. 5a depicts the client overhead definitions and FIG. 5b the mapping of client overhead in FEC blocks of the STM-64/STS-192 signal without any negative influence to the standardized structure. As mentioned above, character "T" identifies the transparent client overhead bytes. FIGS. 6a and 6b show mapping into STM-256/STS-768 server signals, i.e. into 40 G server signals.

Usually, the local cross connect function of the standard SONET/SDH multiplexer entity runs on a central timing reference to be able to implement a column switch that connects the different STS/VC payloads and multiplexes into a SONET/SDH signal. However, since the SONET/SDH signals entering the system may have different timing sources, synchronization of the STSNC payload towards the system timing reference is preferably taking place by means of a pointer processing in the MS adaptation function.

For the adaptation of the RS/MS overhead of the client signal towards the system timing reference, there are, however, no standardized adaptation functions available.

Based on the fact that some of the overhead bytes contain serial data protocols, an implementation of simple byte slip/skip mechanisms for these bytes may destroy the logical contents of this data in asynchronous network environments. Therefore, dedicated adaptation algorithms for some of the transparently transported overhead bytes are proposed in illustrative embodiments of the invention.

In addition for overhead bytes containing error counts, such as B2 and M0/M1, algorithms are supported which ensure that error counts are passed consistently through the network and hence, providing logical transparency.

Figure 4:
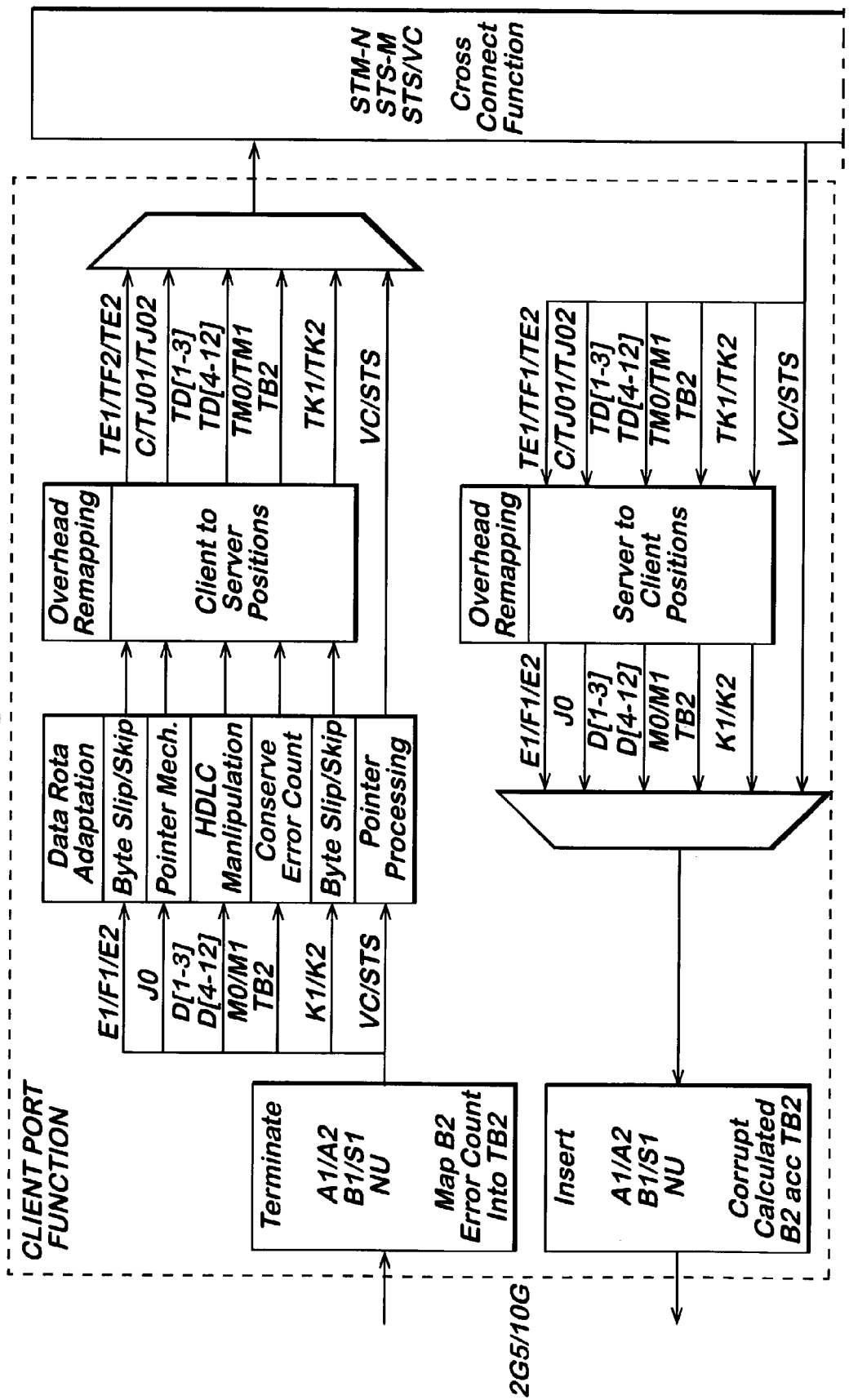
FIG. 4 schematically depicts a system architectural block diagram according to the invention.

In particular, with regard to FIG. 4, the following synchronization and adaptation protocols are preferably defined.

As mentioned above, overhead byte J0 carries a section base identifier (STI), which length may be 1, 16 or 64 bytes. The length of the STI string depends on the STI mode provisioned by the user. In every frame, one byte is transmitted. Thus, since a slip/skip function of one byte of this string can disrupt a complete string, an adaptation protocol can be implemented for J0 that avoids corruption of the string.

At the input of the client port the received J0 byte is adapted to the system timing reference, for example, by means of a protocol consisting of three bytes, those being one control byte (C) and two data bytes (TJ01 and TJ02). Nominally, one byte of J0 information is transported every frame in TJ01. If there is a frame slip/skip, stuffing of the J0 information is performed by sending either 0 or 2 data bytes within the current frame. If two bytes are sent, both TJ01 and TJ02 contain J0 information, wherein the number of bytes transported via TJ01/TJ02 is indicated by the control byte (C).

Then, intermediate network elements handling server signals with embedded clients may accommodate the timing difference between received and local system timing by processing the client J0 protocol in C/TJ01/TJ02, wherein the control and data bytes are preferably adapted in such a way that the J0 information remains consistent.

At the client port source function entity, the C/TJ01/TJ02 message is interpreted and the original J0 string is restored and inserted in the J0 position of the client signal even if the J0 insertion rate may differ from the restored client J0 rate, since this difference is easily adapted by the removal or duplication of a complete recovered STI string.

With regard to overhead bytes DCCR/DCCM, since the DCC bytes carry management information and consist of messages embedded within the HDLC protocol, these HDLC protocols can be analyzed and stuffing information can be added or removed. In one embodiment, these steps are performed by inserting or deleting idle/flag bytes at the appropriate positions in the HDLV frame according to the following rules:

A flag byte can be inserted before or after a single flag;
an idle flag can be inserted before or after another idle flag byte or in between two flags;
a flag can be removed if it preceded or followed by another flag; and
an idle flag can always be removed.

For example, the definition of a flag is one "0" bit followed by six contiguous "1" bits and one "0" bit. An idle byte for example is defined as sequence of eight "1" bits.

Then, intermediate network elements which process server signals with embedded client overhead preferably have to perform the same protocol analysis over the transparent client overhead bytes, e.g., over the TDCC bytes of the client signal.

Concerning the overhead bytes E1/E2/F1, these bytes are used for 64 kbit/s user and order wire channels. As these channels do not contain high priority traffic, a slip or skip of this data is considered acceptable and, therefore, a byte slip/skip mechanism is sufficient. This mechanism, however, preferably is guaranteeing the consistency of processed bytes in themselves but is not needed for preventing the loss of certain bytes or doubled transmission of bytes in case of frequency deviations between the system and receive frequencies.

Concerning the overhead bytes K1/K2, a byte slip/skip mechanism also can be used as the contents of these bytes are semi-static by nature. The slip/skip protocol handles the K1 and K2 bytes as one entity, which means that these two bytes are preferably always slip/skip processed together, so that only K1/K2 information belonging to one frame are inserted together into the data of one outgoing frame. It should be noted that, according to the SONET/SDH standards, the acceptance of K1/K2 is based on having received equal values for three consecutive frames and, hence, this easy mechanism can be supported.

Concerning overhead bytes M0/M1, these bytes contain MS remote error count information (MS-REI), whereby the incoming bit errors as received at the client port input are restored at the client port output after their transport through the network. To achieve the end to end logical transparency two functional mechanisms can be implemented, by way of example:

(1) An adder mechanism for taking care that error counts which cannot be transported due to frame slips is added to the MS-REI value inserted into the next frame. If the adder result exceeds the maximum error count, the TM0/TM1 value is held to the maximum error count such as, for example, to 1536 for STM-64/OC-192 clients and to 384 for STM-16/OC-48 client signals.

(2) If the TM0/TM1 bytes must be duplicated due to frame slips, the duplicated bytes are set to zero.

In one embodiment, M1 can be supported for STM-16/STS-48 and STM-64/STS-192 client signals, wherein a M0 support is a configurable option for STM-64/STS-192 clients.

Concerning overhead byte B2, this byte contains BIP information of the MS-layer, whereby the incoming bit errors as received at the client port input are restored at the client port output after their transport through the network. BIP errors occurring on the server signal during the client transport, and which are associated with the client part of the server signal, can be reflected at the client port output of the network. Incoming B2 errors at the client port input are detected, whereby an error count is inserted in the TB2a/TB2b overhead bytes of the client signal. TB2 consists of two bytes to be able to transport the maximum number of B2 errors for STM-64/STS-192, which is, as mentioned above, 1536.

If B2 errors that are associated with the client part of the server signal occur in the network on the server signal, these errors are added to the received client TB2 information and forwarded as the new TB2 value. Then, on the client port output, a new B2 is calculated, wherein this B2 value is corrupted according to the number of errors as provided by TB2. The corruption can be performed by inverting correct parity bit(s). For example, if the calculated B2=11001101 and TB2=2, then two bits of B2 are inverted resulting in 1100111.

For TB2, a similar adder mechanism as for M0/M1 can be provided to achieve the logical transparency. Thus, if the TB2 exceeds the maximum possible error count for the associated client signal, TB2 is truncated to the maximum value which can be, for example, 1563 for STM-64/OC-192 clients and 384 for STM-16/OC-48 client signals.

By using the above described overhead byte synchronization and rate adaptation protocols within the adapted system architecture according to the invention, the transport of transparent STM-16/STS-48 signals and the transport of transparent STM-64/STS-192 signals are supported.

Moreover, the multiplexing of up to 4×STM-16/STS-48 client signals (T2.5 G) or any combination of T2.5 G and regular VC/STS payload into a STM-64/STS-192 signal and, for example, the multiplexing of up to 16×STM-16/STS-48 client signals (T2.5 G), or up to 4×STM-64/STS-192 client signals (T10 G) or any combination of T2.5 G, T10 G and regular VC/STS payload into a STM-256/STS-768 signal is supported.

Figure 7A:
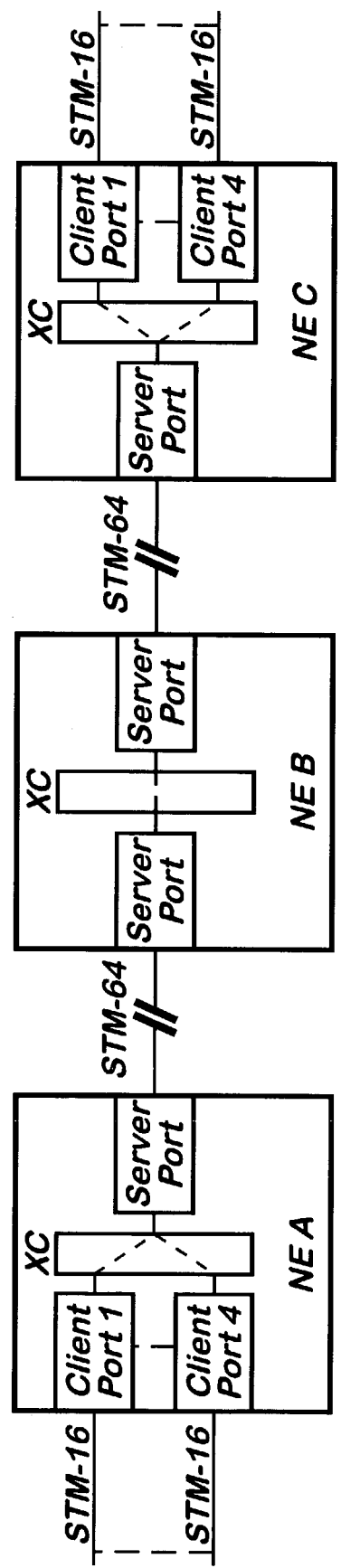
FIGS. 7*a*, 7*b*, and 7*c* depict exemplary embodiments of multiplexing schemes according to the principles of the invention.
Figure 7B:
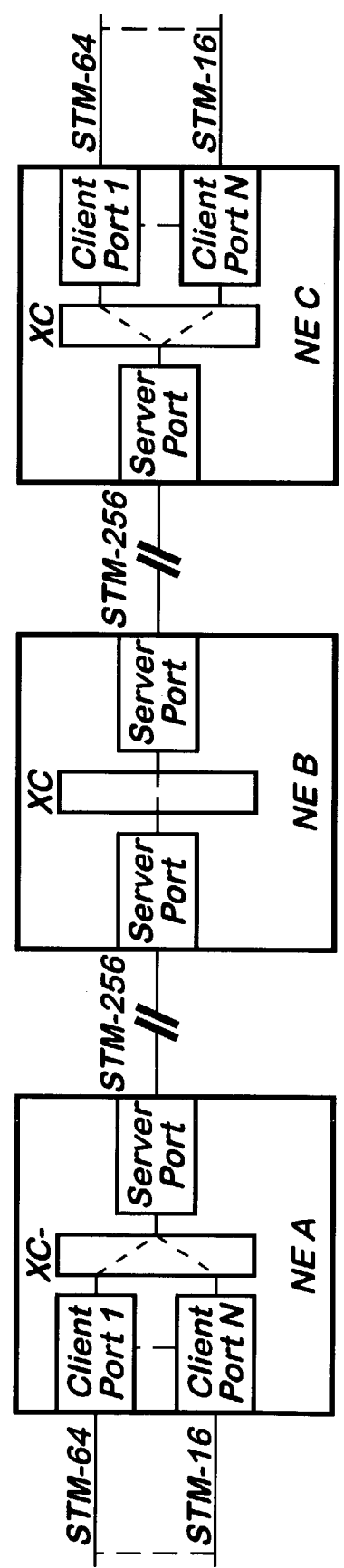
Figure 7C:
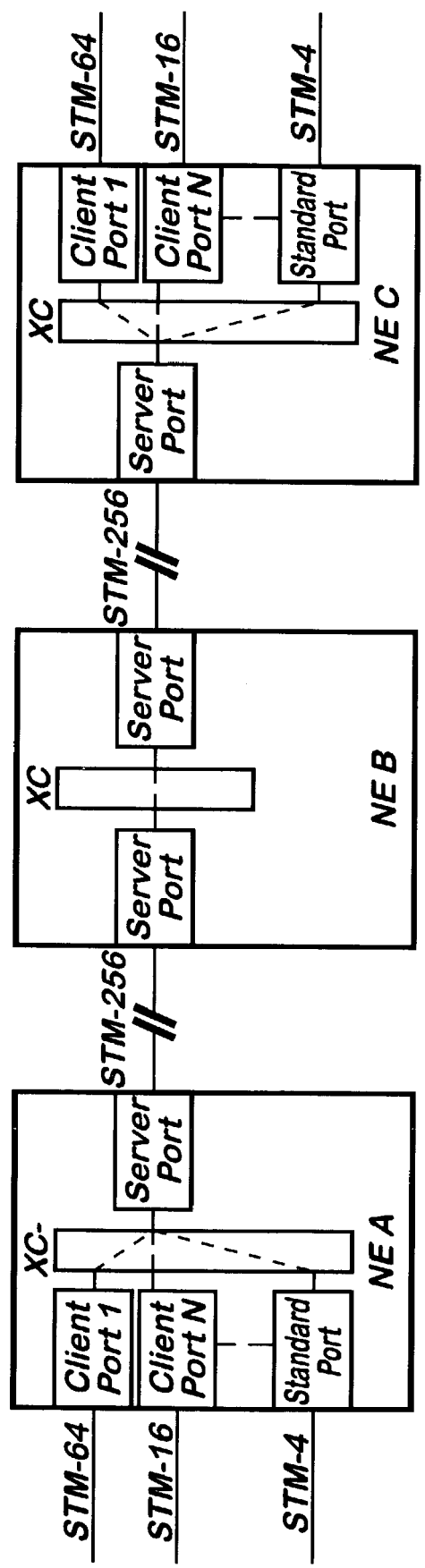

FIGS. 7a, 7b and 7c depict exemplary embodiments of multiplexing schemes. FIG. 7a shows a 4× transparent STM-16 service over STM-64 servers signals, FIG. 7b shows mixed transparent STM-16/STM-64 services over STM-256 server signals, and FIG. 7c shows mixed VC services and transparent STM-16/STM-64 services over a STM-256 transport signal, respectively, via three network entities NE_A, NE_B and NE_C with a transparently adapted cross connection means XC in between the respective input ports and output ports.

For preventing a network user from having to provide the STSNC payload structure of the signal for handling the transparently transported SONET/SDH signals as a real pipe, a network element adaptation can be implemented according to the principles of the invention such that this real pipe behaviour is achieved by the pointer processors of the network element operating in an adaptive mode. In one exemplary embodiment of an adaptive mode, the pointer interpreters detect the payload structure of the pipe according to the concatenation scheme present in the pointer bytes and the associated pointer processing functions adapt automatically according to this detected payload structure.

With regard to performance monitoring, the described architecture ensures the performance monitoring of the client SONET/SDH signals embedded in the higher rate server signal. Thus, on the client MS layer, the error performance of TB2 and T(M0), T(M1) can be monitored without terminating the client signal. Moreover, due to the integration of the transparent client functionality with existing SONET/SDH functionality, the performance monitoring on the STS/HO-VC layer of the client is also supported.

However, with respect to fault management, the transparent client signal is handled as a sub-layer of the server signal, which is carrying the service. As a consequence, a signal fail of the server signal results in signal fail(s) for the embedded client signal(s).

Regarding network management support, a logical transmission model is normally used for the management of a network element, wherein the model describes the transmission connectivity within the network element as seen by an external user. As is well known in such a model, the entities that play a role and how they interact in providing connectivity between signals in transmission interfaces attached to the system are generally described.

Thus, for a standard add-drop multiplexer (ADM), the following logical entities may be defined, by way of example:

(1) The logical entity of a port modelling within the network element the function of the physical port and the regenerator section RS and multiplex section MS layer functions associated with the port. As is known, a key characteristic of such a port usually is its bandwidth.

(2) The logical entity of a port tributary modelling within the network element the function of a physical port tributary and the associated processing. For example, a STS-1,3 . . . port tributary for SONET and a VC-3,4 . . . port tributary for SDH.

Thus, to integrate transparent SONET/SDH client signals into the existing logical model of an ADM according to the principles of the invention:

a new layer is introduced which is the support layer being an entity through which SONET/SDH client signals can be cross connected in a network element, wherein the support type preferably have three values: standard, TMUX and TADM. The TMUX and TADM type refer to the different modes of transparent client connectivity while the support type standard refers to standard ADM operation;

an attribute is added to the port entity which is a port type that also can have three different values: standard, client and server. The port type standard refers to standard ADM operation, the port type client is used for ports where the SONET/SDH signal which needs to be transported transparently, enters and leaves the system;

a logical model allowing cross connections for entities of the same layer only, e.g., tributaries with tributaries and supports with supports is added to the standard model.

Figure 8A:
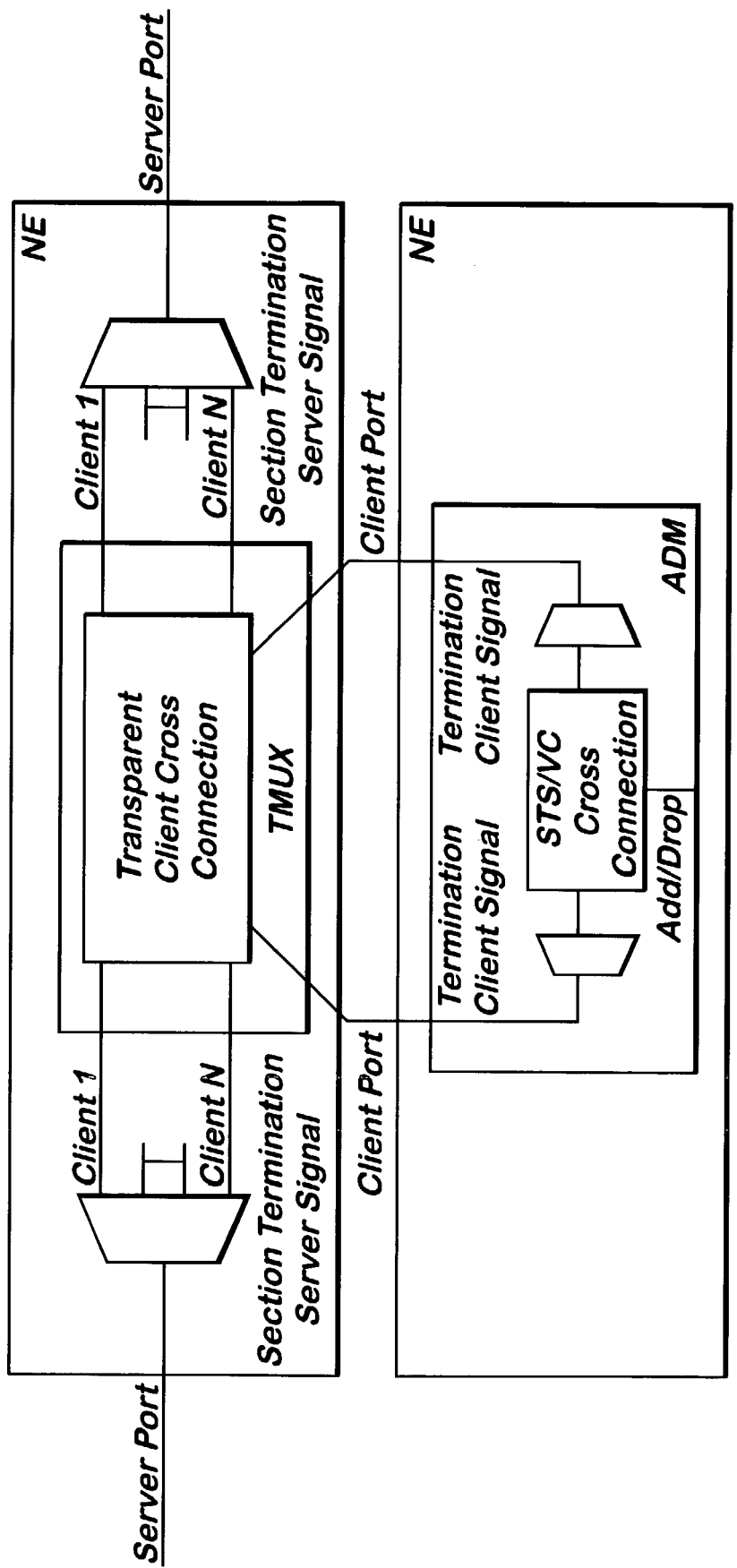
FIG. 8*a* depicts the functionality of transparently multiplexing with a separated add-drop multiplexer according to the principles of the invention.
Figure 8B:
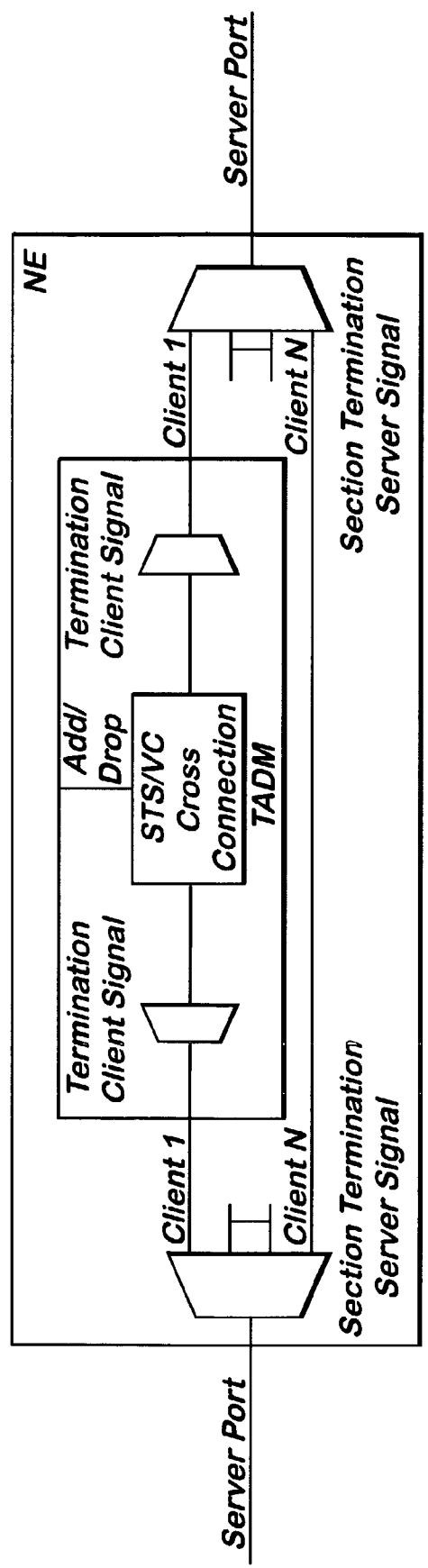
FIG. 8*b* depicts the combination of transparent multiplexing and the add-drop multiplex functionality according to the principles of the invention.

One major benefit of the integrated overhead transparency is the capability of combining transparent SDH/SONET signal transport together with SDH/SONET payload based transport functions in the same network element, which can be referred to as transparent Add/Drop multiplexing (TADM) functionality. FIG. 8b shows this advantage compared with a separate TMUX functionality and ADM functionality implemented in different network elements as depicted in FIG. 8a.

In particular, the functionality of the transparent multiplexing TMUX enables a network element to transparently transport and cross connect SONET/SDH client signals within higher rate server signals, wherein the termination, e.g., the overhead termination, of the embedded client signals is not supported. In comparison, the transparent Add/Drop multiplexing functionality TADM additionally is enabling the termination of the client signal(s) embedded within the higher rate server signal and hence combines the TMUX and ADM functionality enabling the performance of transmission protection on the embedded client signal(s).

Figure 9:
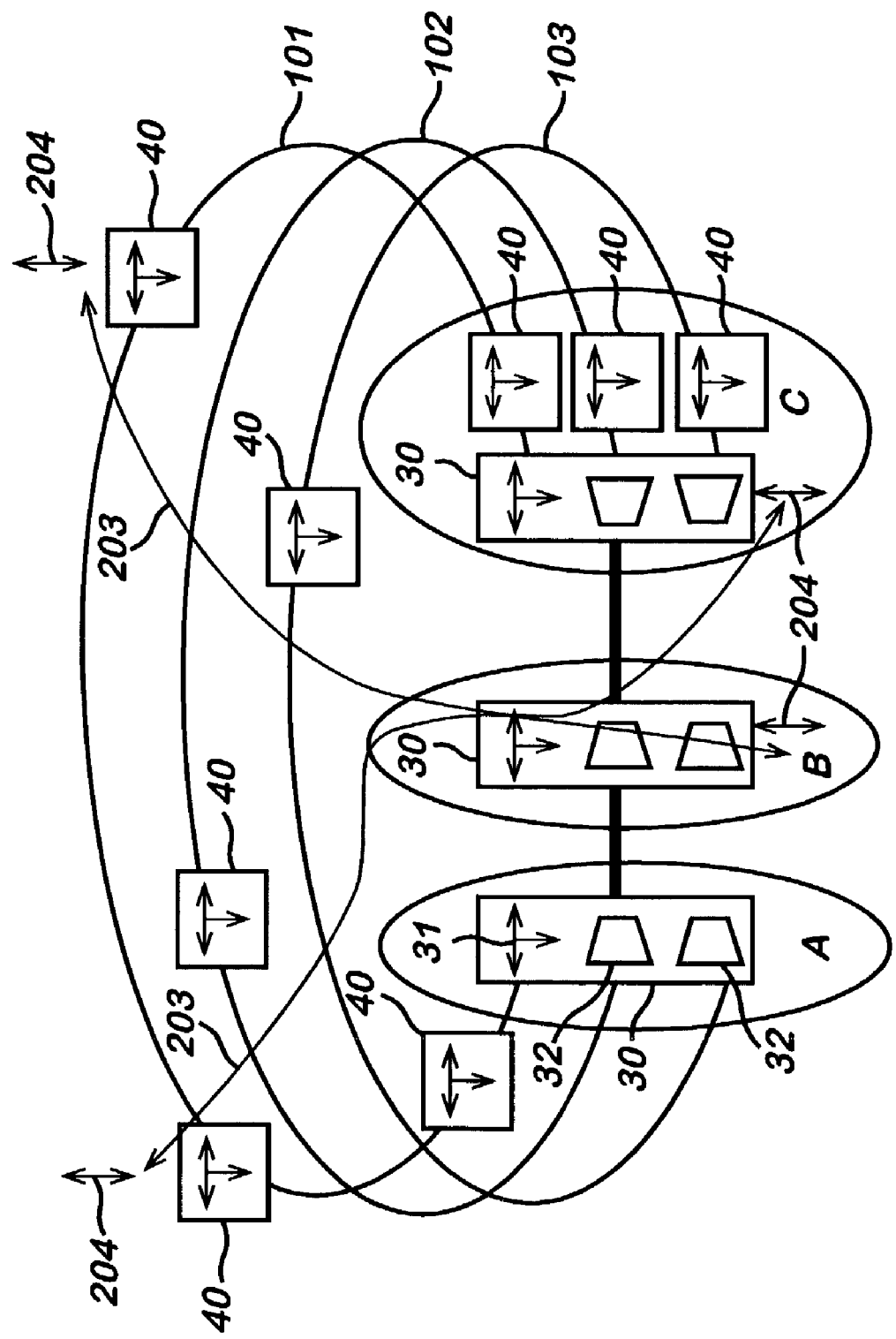
FIG. 9 schematically depicts an illustrative application of TADM/TMUX functionality according to the principles of the invention.
Figure 10:
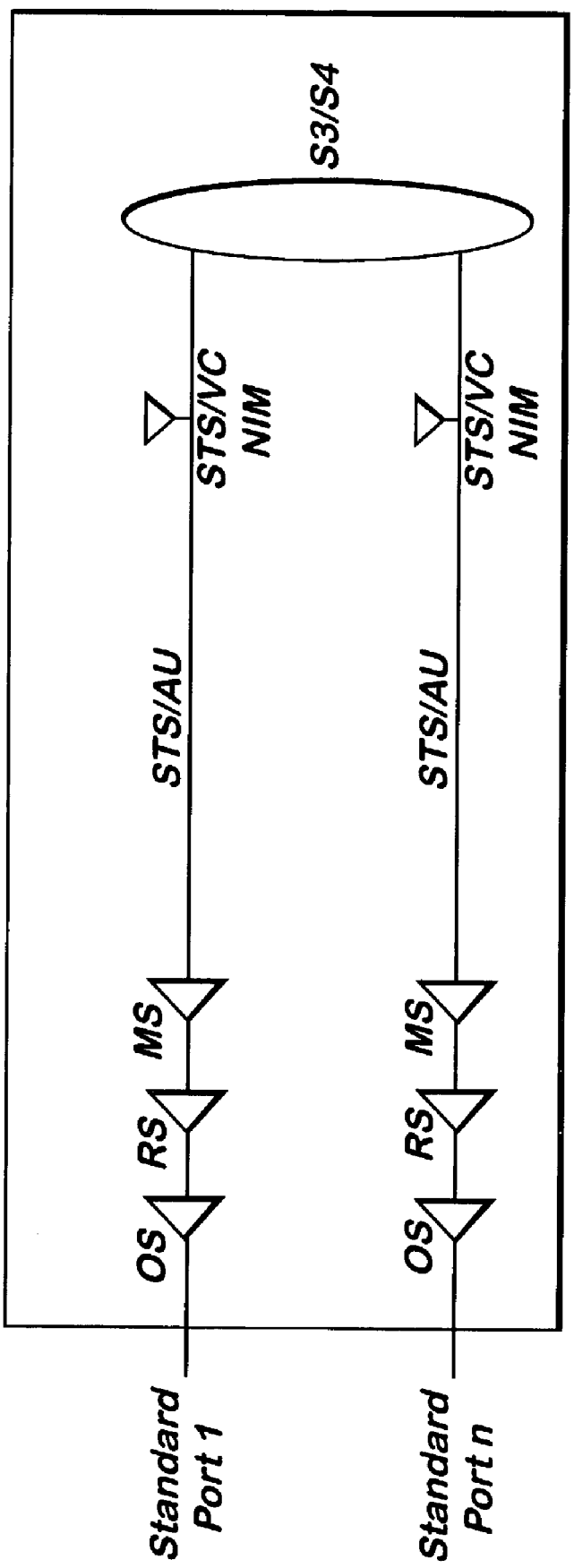
FIG. 10 schematically depicts a standard SONET/SDH transmission functional model.

The applications of the TMUX and ADM functionality are shown in FIG. 9 based on an example of fiber shortage issue in a stacked ring network. The example according to FIG. 9 shows a network of three legacy stacked rings 101, 102 and 103 and a fiber shortage between the location A and the location C. In this exemplary network, the network elements 30 are adapted to perform the TADM functionality 31 and the TMUX functionality together with the TADM functionality 32 and hence are adapted according to the invention to provide SONET/SDH cross connection or Add/Drop multiplexing functionality with the transparent cross connect and/or multiplexing functionality. The depicted network elements 40 identify elements providing 2.5 G/10 G legacy ADM functionality. A possible payload transport via TADM is depicted in FIG. 9 by the double arrows 203 and the adding and dropping functionality is indicated by the double arrows 204. Thus, ring 101 can be operated in the TADM mode and all of the other rings 102 and 103 or ring portions are operated in TMUX mode.

As a result, the SDH/SONET integrated transparency together with high aggregate bit rates can solve the following problems. By transparently multiplexing the ring 101 (a 2.5 G ring) into a higher TDM (Time Division Multiplex) bit rate line signal of, for example, 10 G or 40 G, and by operating this in overhead transparency mode, the fiber shortage issue between the location A and B can be resolved. For the legacy equipment 40 in the ring 101, this multiplexing, i.e., transparent multiplexing, is not visible so existing network management functions and line or ring protection schemes will still work without any change. For the rings 102 and 103, for example, correspondingly designed for a 10 G or 40 G bit rate signal, the integration of transparent multiplexing and termination of the multiplexed signals results in the advantage of supporting the adding or dropping of payload traffic at the locations A, B or C.

As a consequence, TADM can be seen as a unique capability that supports the customer in reducing equipment cost, since in comparison thereto, a one-step approach to terminate transparent clients within a server signal is not possible without a TADM mode. In other words, when the TMUX functionality is used to multiplex and demultiplex the client signal into or from the server signal, an additional ADM functionality is needed to terminate that client signal.

Hence, the present invention enables the transport of SONET/SDH signals or frames as a service, in particular, as an end-to-end service including payload and overhead information. Accordingly, such an approach adds significant value to existing networks or systems due to the described integration into existing SDH/SONET systems and system concepts and due to the possibility to co-exist with standard compliant SDH/SONET payload service functions. As the server (line) signal format does not change, the multiplexing of SDH/SONET signals or frames into higher bit rate SDH/SONET signals and the transporting of these higher bit rate SDH/SONET signals over existing state of the art transoceanic systems is enabled. By supporting the easy integration into existing SDH/SONET network element concepts and by ensuring the smooth operation over timing domains due to the rate adaptation functions, the inventive mapping functionality of the additional transported client overhead is compatible with existing SDH/SONET regenerators, transoceanic systems, and standardized multi-bit forward error correction, as described above.

The foregoing embodiments are merely illustrative of the principles of the invention. Those skilled in the art will be able to devise numerous arrangements, which, although not explicitly shown or described herein, nevertheless embody those principles that are within the scope of the invention. Accordingly, the scope of the invention is limited only by the claims appended hereto.

We claim:

1. A method for transporting SDH/SONET client signals as a service, wherein an associate SDH/SONET client payload is embedded within a SDH/SONET server signal, comprising:

mapping overhead information of at least one SDH/SONET client signal into the SDH/SONET server signal, wherein the client overhead information of the at least one SDH/SONET client signal is mapped into free overhead positions of the SDH/SONET server signal; and transporting the SDH/SONET server signal with the payload information and the mapped client overhead information of the at least one SDH/SONET client signal embedded therein;

wherein data rate adaptation of certain SDH/SONET client overhead information is performed prior to the step of mapping to maintain logical content thereof; the certain SDH/SONET client overhead information comprises Data Communication Channel (DCC) bytes carrying HDLC frames, the data rate adaptation being performed by inserting or deleting idle/flag bytes at positions in the HDLC frames according to the following rules;

a flag byte can be inserted directly before or directly after a single flag, an idle flag can be inserted directly before or directly after another idle flag byte or directly between two flags, a flag can be removed if it is directly preceded or directly followed by another flag, and an idle flag can always be removed.

2. The method of claim 1, wherein the step mapping further comprises routing of overhead information for maintenance, management and protection of the at least one SDH/SONET client signal through a STS/VC cross connection matrix.

3. The method of claim 1, wherein the step of mapping overhead information of the at least one SDH/SONET client signal into the SDH/SONET server signal is performed at least near an input interface of a network by multiplexing the overhead information into a SDH/SONET server signal having a higher bit rate in comparison to the at least one SDH/SONET client signal and/or wherein, at least near an output interface of a network, the mapped overhead information of the at least one SDH/SONET client signal is partially processed and mapped back into respectively defined standard overheard positions of the at least one SDH/SONET client signal.

4. The method of claim 1, further comprising the step of terminating SDH/SONET client overhead information embedded within the SDH/SONET server signal.

5. The method of claim 2, further comprising: Selecting overhead positions of the at least one SDH/SONET client signal, said positions including specific standard overhead information of the at least one SDH/SONET client signal;

mapping the specific standard overhead information of the selected positions to client overhead positions of the respective associated SDH/SONET client payload of the at least one SDH/SONET client signal; and multiplexing the SDH/SONET client payload into the SDH/SONET server signal.

* * * * *